April 13, 1926.

J. E. McGEE 1,580,619

SERVING TRAY SUPPORT

Filed-August 28, 1924

Inventor
Jesse E. Mc. Gee.

By Beall & Fenwick.
Attorneys

Patented Apr. 13, 1926.

1,580,619

UNITED STATES PATENT OFFICE.

JESSE E. McGEE, OF GUNTOWN, MISSISSIPPI.

SERVING-TRAY SUPPORT.

Application filed August 28, 1924. Serial No. 734,764.

*To all whom it may concern:*

Be it known that I, JESSE E. McGEE, a citizen of the United States, residing at Guntown, in the county of Lee and State of Mississippi, have invented certain new and useful Improvements in Serving-Tray Supports; and I do hereby declare the following to be a full, clear, and exact description of the invention, such as will enable others skilled in the art to which it appertains to make and use the same.

This invention relates to an improved construction of serving tray support for automobiles and more particularly to a support which can be readily clamped to or over the top of a door of an automobile to support a tray when refreshments are to be served at the curb or at any other time.

An object of the invention is to provide a suitable serving tray support for automobiles which will adapt itself to seat on different sizes of automobile doors or other parts of an automobile to support a tray when refreshments are being served at the curb, thereby making it unnecessary for the occupants of the automobile to leave the same.

A further object of the invention is to provide a serving tray support for automobiles which will be highly efficient in use and quite inexpensive to manufacture.

Other objects will appear as the description proceeds.

In the accompanying drawings which form a part of my application,

Like characters of reference are used throughout the following specification and the accompanying drawings to designate corresponding parts.

Figure 1:
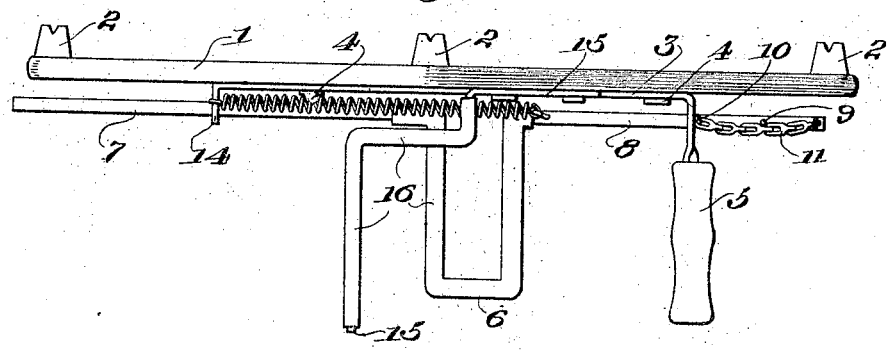
Fig. 1 is a side elevation of my improved serving tray support.
Figure 2:
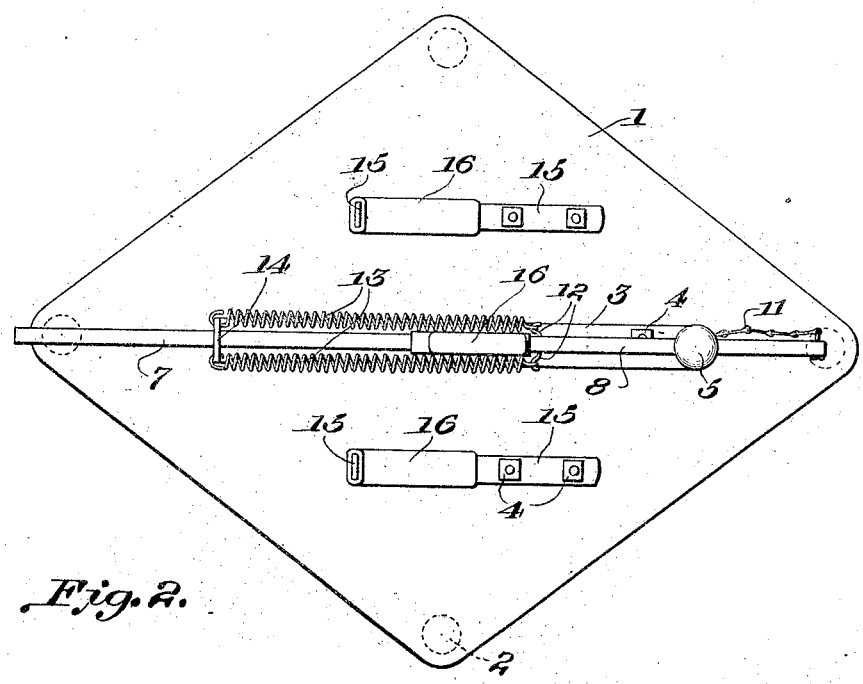
Fig. 2 is a bottom plan view of the same.

My invention comprises a relatively thin supporting platform 1 which may be made of thin wood or metal, or any desired suitable material. The platform 1 as shown in the drawings is substantially diamond-shaped and is provided on its upper surface at its several corners with the rubber cushioning members or pads 2, which serve to prevent a tray from sliding from the platform when in position thereon.

A substantially U-shaped bracket or frame 3 is secured to the underneath surface of the platform 1 by suitable bolts 4, and is disposed in inverted position. One end of said bracket 3 extends downwardly a considerable distance and is provided at its free end with a suitable handle 5.

The opposite ends of the U-shaped bracket 3 are provided with bearing openings through which is mounted the slidable clamping member, which comprises a U-shaped portion 6 having laterally extending alined bearing extensions 7 and 8. The bearing extension 8 is provided with a plurality of spaced openings 9 through which the pin 10 is adapted to be passed. The pin 10 is carried at the free end of a suitable chain 11 which is made fast to the extreme end of the said extensions 8.

Hooks 12 are secured to the opposite sides of the bearing extensions 8 adjacent the U-shaped portion 6 thereof and have attached thereto one end of the coil springs 13, which are mounted at either side of the extension 7 and are held at either side of the short arm 14 of the bracket 3.

The fixed clamping members 15 are disposed at either side of the slidable clamping member and are equally spaced therefrom. Clamping members 15 are so constructed that they have a horizontal bearing surface and also a vertical bearing surface so that the same may be supported on top of the door of an automobile and also engage the inner wall of the said door. The U-shaped slidable clamping member 6 and the oppositely disposed fixed clamping members 15 are suitably covered with cushioning material 16 to prevent the same from scratching or injuring the paint on the door of the automobile, also serving to prevent slipping of the tray support when in operative position.

From the foregoing description it will be apparent that the tension of the springs 13 is obtained by the positioning of the pin 10 in the desired opening 9.

When persons are driving they often stop at a store and request that refreshments be served at the curb, and it is to prevent the occupants of the automobile from having to go into the store to be served that I have designed my present invention.

The lower ends of the fixed clamping members and of the handle 5 are all approximately on the same plane so that the tray support will readily stand on a flat surface while the refreshments are being placed on a tray on the said support.

In operation the attendant will grasp the handle 5 in the palm of his hand and engage the same with his thumb and at the same time grasp the adjacent side of the U-shaped clamping member 6 and will draw the said clamping member towards the handle against the tension of the springs 13. He will then place the support over the upper surface of the automobile door so that the fixed clamping members will be supported on top of the door and will also extend along the inner side thereof. He will then permit the slidable clamping member to be drawn towards the outer surface of the door until it contacts therewith, whereupon the tension of the springs 13 will securely hold the support in operative position.

In this manner refreshments may be readily served at the curb with a minimum of trouble and as soon as the said refreshments are dispensed or handed to the persons in the automobile the attendant may at once go into the store and attend to his business until such time as the refreshments are consumed. In this manner it will be unnecessary for the attendant to stand at the curb and wait while the persons in the automobile are eating the refreshments.

Many minor changes in detail of construction may be resorted to without departure from the spirit of the invention.

Having thus described my invention what I claim as new and desire to secure by Letters Patent of the United States is:

A serving tray support comprising a platform, cushioning means thereon, an inverted U-shaped bracket or frame on the lower surface of said platform, said frame being provided with alined bearing openings, a handle formed on said frame, a U-shaped slidable clamping member having oppositely extending alined bearing arms, said arms being adapted to extend through said bearing openings in said frame, a pair of fixed clamping members disposed at the opposite sides of said movable clamping member, a pair of springs positioned between said frame and said movable clamping member, adapted to draw said movable member toward said fixed members, and means for limiting the movement of said slidable clamping member.

In testimony whereof I affix my signature.

JESSE E. McGEE.